UNITED STATES PATENT OFFICE.

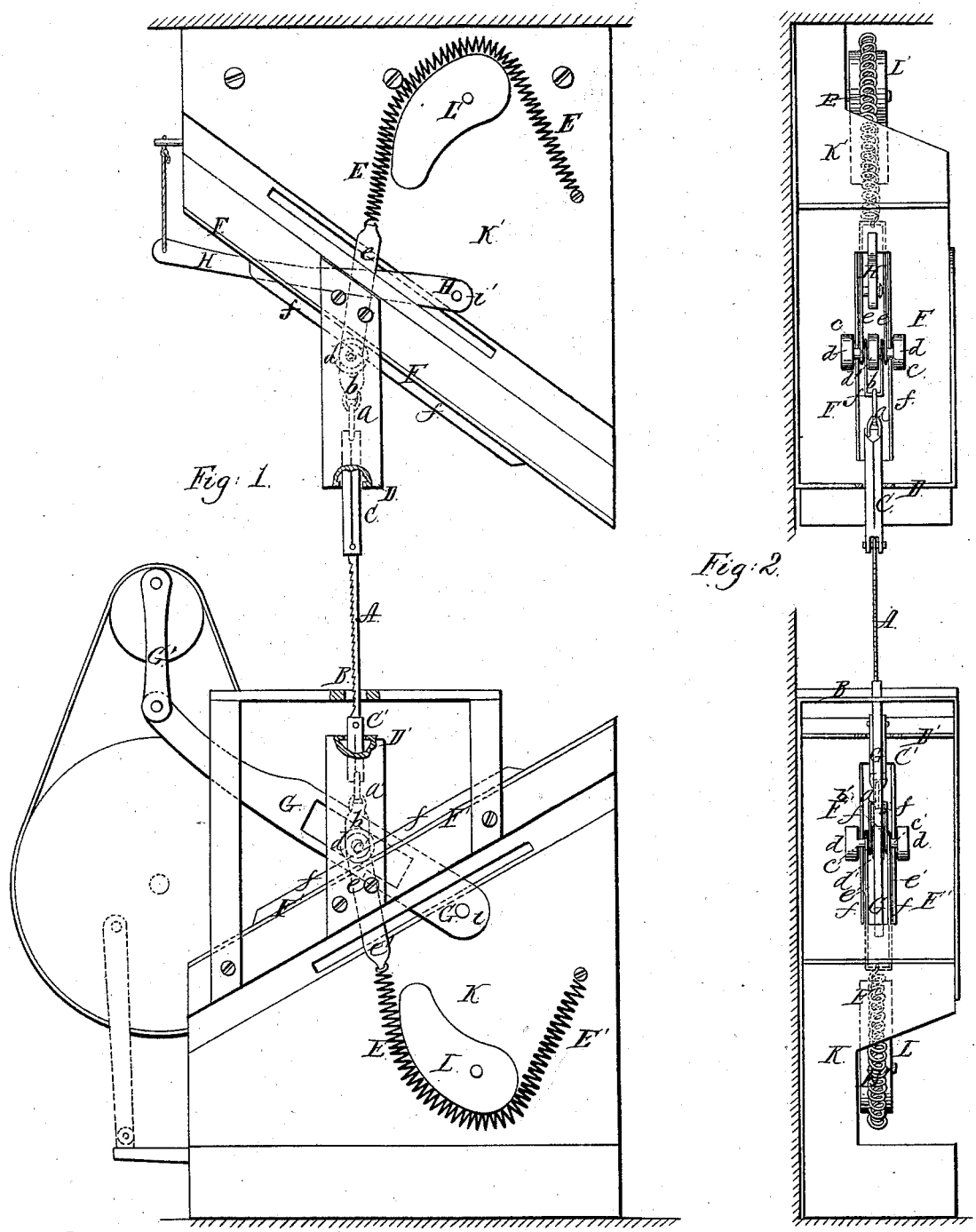

L. D. BARRAUD, OF NEW YORK, N. Y.

SCROLL-SAWING MACHINE.

Specification of Letters Patent No. 32,507, dated June 11, 1861.

*To all whom it may concern:*

Be it known that I, LOUIS D. BARRAUD, of New York, in the county and State of New York, have invented a new and useful Improvement in Hanging and Operating Scroll-Saws; and I do hereby declare that the following is a full, clear, and exact description thereof, reference being had to the accompanying drawings, making a part of this specification, in which—

Figure 1, is a side elevation showing the improved method of hanging and operating a scroll saw. Fig. 2, is a front elevation of Fig. 1.

Similar letters of reference indicate corresponding parts in both figures.

This invention relates to certain improvements in that class of sawing machines in which a saw frame or sash is not employed, and which are generally known as "muley" saws.

The invention consists firstly, in two roller carriages between which the saw is hung and strained said carriages working against two inclined surfaces and held against said surfaces by the straining springs of the saw as will be hereinafter described for the purpose of keeping the saw under a proper degree of tension and guiding it in its reciprocating movement in a firm and steady manner. Secondly, in a slotted lever in combination with the lower saw carriage for giving the alternate reciprocating motion to the saw as will be hereinafter described.

To enable those skilled in the art to make and use my invention I will proceed to describe its construction and operation.

In the accompanying drawings A. represents the saw which passes vertically through a hole in the table B. and is keyed in a suitable manner at its ends to the ends of guide bars C. C'. which work through their respective stationary guides D. D'., one above and the other below the table B. These guide bars C. C'. and stationary guides D. D'. keep the saw in a vertical plane and prevent it from turning. The guide bars C. C'. are connected by links $a$, $a'$, or in any other suitable manner to portions $b$, $b$, which are pivoted respectively to axles $c$, $c'$, each carrying three rollers or wheels $d$, $d$, $d$, forming carriages. To the axles $c$, $c'$, the helical springs E. E'. are attached by pivoted connecting plates $e$, $e'$, which springs hold the two outer rollers $d$, $d$, of each axle $c$, $c'$, against their respective inclined planes F. F'. on which the rollers $d$, $d$, $d$, $d$, move. These inclined planes F. F'. are arranged one above the other in the same vertical plane as shown in Fig. 2, of the drawings and they are inclined in opposite directions one over and the other under the work table B.

The helical springs E. E'. operate to keep the carriages against their respective inclined surfaces F. F'. thus the spring E. keeps the rollers $d$, $d$, of the upper carriage up against the inclined surface F. and the spring E'. holds the rollers $d$, $d$, of the lower carriage down on the inclined surface F'. so that in the operation of the saw the rollers of both carriages will roll on their respective inclined surfaces. The middle rollers $d'$, $d'$, of both carriages work in slots made through the inclined planes F. F'. and between the flanged guides $f$, $f$, projecting up along the edges of the slots. These intermediate rollers $d'$, $d'$, are used as friction rollers for the levers G. and H. The lower lever G. is the driver for communicating motion to the saw both in its downward and upward strokes. This lever G. is slotted, as shown in Fig. 1, and the middle roller $d'$, of the lower carriage plays in this slot. The lever G. is pivoted to frame K. at $i$, and to its outer end a rod G'. is pivoted which connects eccentrically with a driving wheel as represented in Fig. 1, in red lines or a vibratory motion may be imparted to the outer end of this lever G. in any other convenient manner.

The upper lever H. is pivoted to frame K'. at $i'$, and projects through the slot in inclined plane F'. and over roller $d'$, in the upper carriage. This lever H. is used to depress the upper carriage when it is desired to take out or put in the saw A. so that the action of spring E. will be removed from the saw A. while it is being taken from its guide bars C. C'. This lever H. is held up out of the way of the upper carriage when it is not in immediate use.

The two springs E. and E'. are made strong enough to keep the saw A. under proper tension, the spring E'. is secured at one end to the frame K. and passed under the curved surface of a pivoted block L. and attached at its other end to the pivoted connecting portion of the lower carriage, as before described. The upper spring E. is passed over a pivoted block L'. and otherwise arranged as described for spring E'. These two springs though quite long are brought into a small compass by passing them around the blocks L. L'. which blocks allow the springs to exert their full action upon the saw and keep the saw under constant tension in its upward as well as in its downward movement.

The inclined planes F. F'. need not necessarily be connected together, they may be secured to their respective frames K. K'. and these frames secured, one above the other, in any convenient place.

The operation of my invention is as follows: Motion is given to the outer end of the slotted lever G. and this lever is vibrated rapidly. This lever will now give a vertical reciprocating movement to the saw A. and the work to be sawed is put upon the horizontal table B. and fed up to the saw by hand in the usual manner. It will be seen that when the slotted lever G. is depressed it will move the lower carriage downward on the inclined plane F'. this operation will at the same time move the lower carriage forward, and as the upper carriage is kept against the inclined plane F. by spring E. this upper carriage will be moved downward and backward, or in the same plane with the surface against which it is held. The saw A. will not partake of these vibrating motions of the carriages for the guide bars C. C'. between which the saw is strained work in fixed guides D. D'. which keep these guide bars as well as the saw in a vertical line, while the links or shackles $a$, $a$, allow the carriages to have their full play on the inclined surfaces F. F'.

Having thus described my invention what I claim as new and desire to secure by Letters Patent is,

1. The two inclined planes F. F'. on which the rollers $d$, $d$, $d$, $d$, work, arranged as set forth in combination with springs E. E'. connected to the guide bars C. C'. between which the saw is hung, substantially as herein described.

2. The slotted lever G. connected to the lower carriage on the inclined plane F'. operating as and for the purpose herein described.

3. The guide flanges $f$, $f$, on the inclined planes F. F'. for guiding the rollers $d$, $d$, of the saw carriages as herein set forth.

L. D. BARRAUD.

Witnesses:
JAMES LAIRD,
G. W. REED.